United States Patent [19]

Sereny

[11] Patent Number: 4,756,040
[45] Date of Patent: Jul. 12, 1988

[54] RETRACTABLE CURTAIN FOR AUTOMATIC CAR WASHES

[76] Inventor: Bernard Sereny, 15700 Olive Branch Dr., La Mirada, Calif. 90638

[21] Appl. No.: 112,365

[22] Filed: Oct. 26, 1987

[51] Int. Cl.$^4$ .............................................. B60S 3/04
[52] U.S. Cl. ................................. 15/97 B; 15/DIG. 2
[58] Field of Search ............... 15/97 B, 53 R, DIG. 2

[56] References Cited

U.S. PATENT DOCUMENTS 4,166,302  9/1979  Kim ..................................... 15/97 B
4,369,541  1/1983  Belanger et al. .................... 15/97 B
4,453,284  6/1984  Schleeter ........................... 15/97 B Primary Examiner—Edward L. Roberts
Attorney, Agent, or Firm—Edgar W. Averill, Jr.

[57] ABSTRACT

A retractable curtain useful for automatic car washes of the type having a plurality of downwardly hanging flaps. The flaps are supported by rods held by a curtain frame and the rods are interconnected at each end to each adjacent rod by a pair of elongated links. Preferably, the outermost pair of links are longer than the rest of the links so that the curtain may be retracted a further distance from the center. The retractable curtain may be held on an oscillating frame.

17 Claims, 3 Drawing Sheets

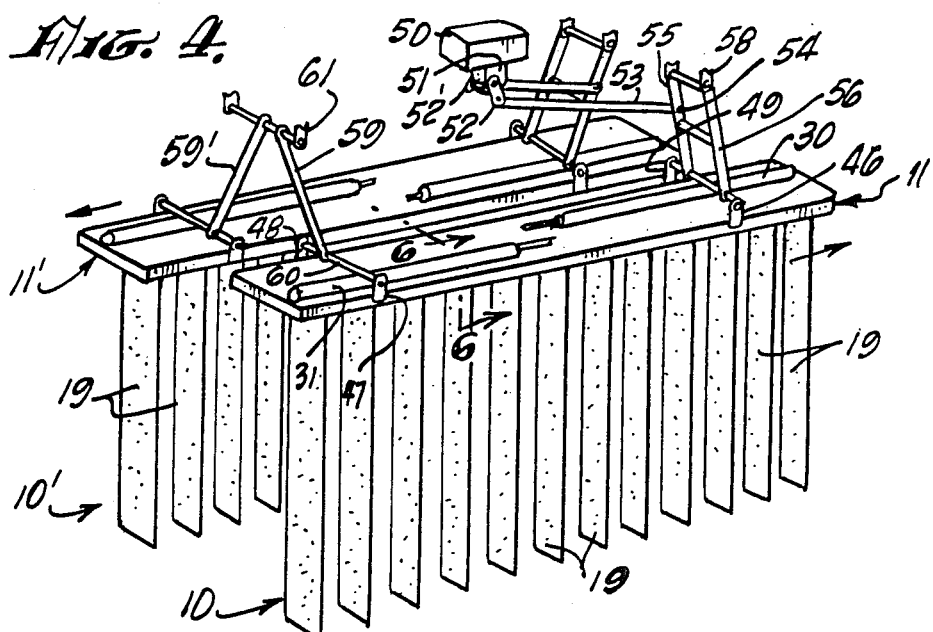
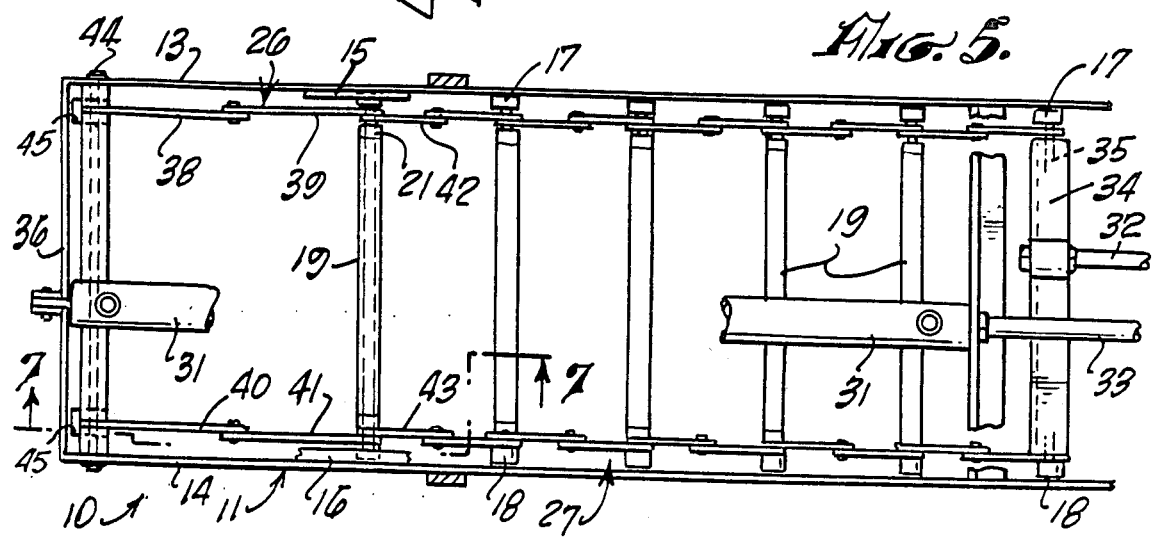
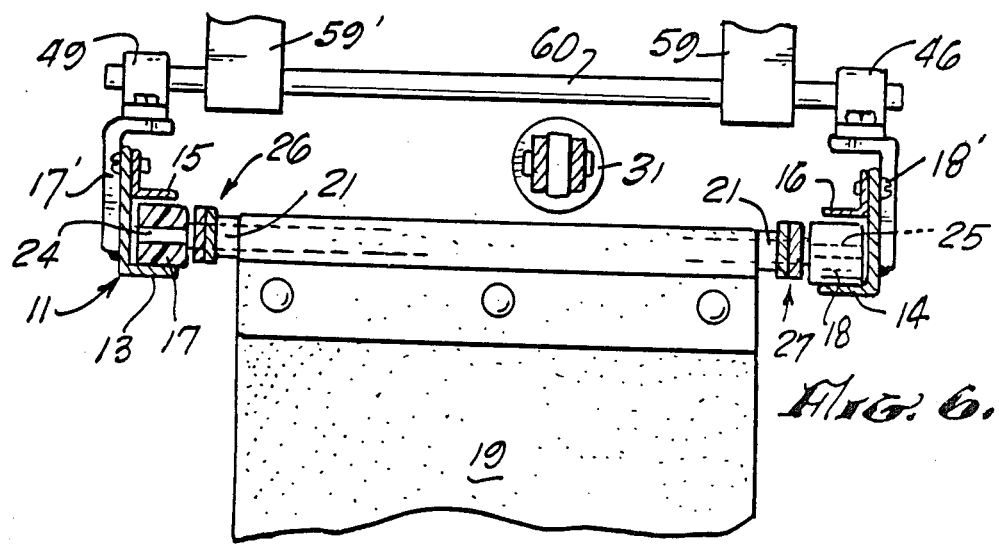

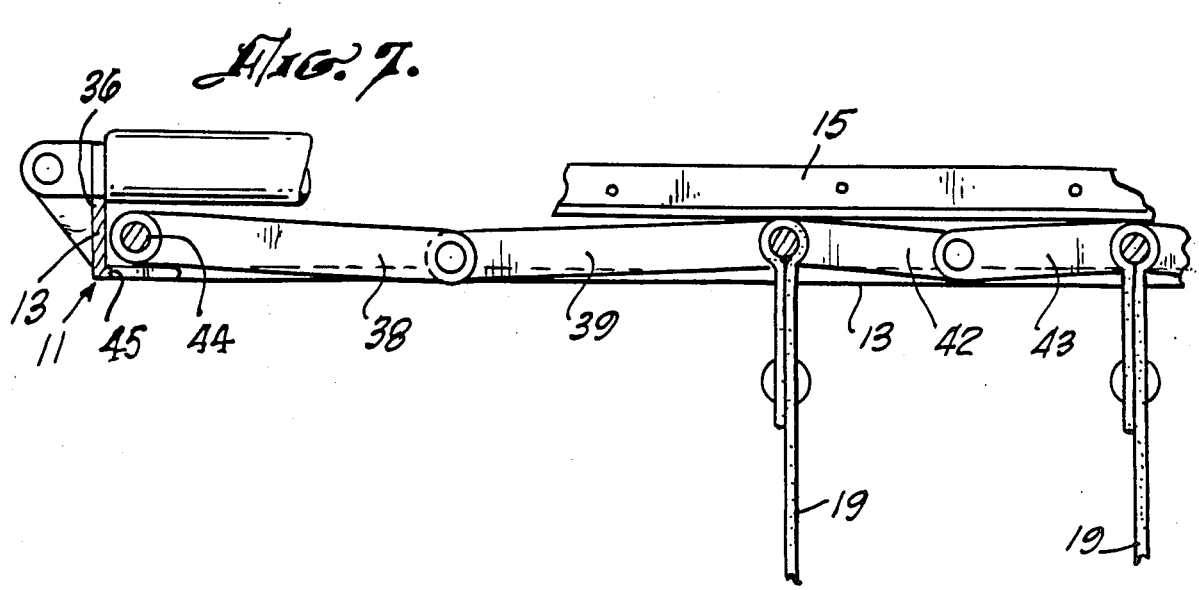
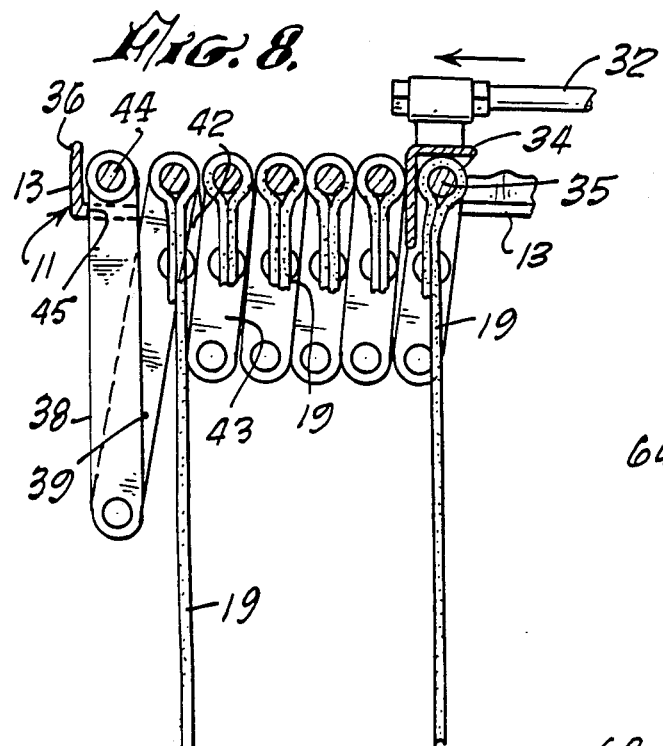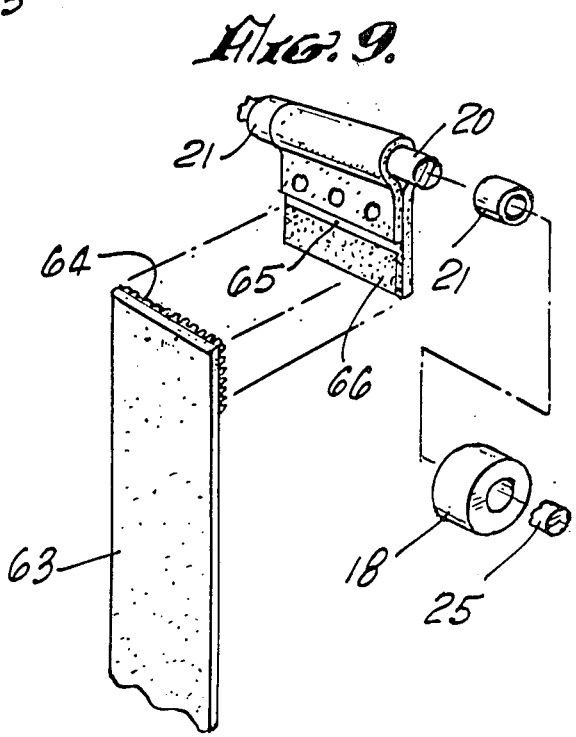

RETRACTABLE CURTAIN FOR AUTOMATIC CAR WASHES

BACKGROUND OF THE INVENTION

The field of the invention is automatic car wash equipment and the invention relates more particularly to that portion of the automatic car wash apparatus which has a curtain typically made from a plurality of flaps of felt-like material, which curtain is used to spread wax, soap suds or other component used in washing a car.

Frequently, car wash customers request that their car be hand washed to lessen the chance that any small scratches are made in the finish of the vehicle. In the past, automatic car wash operations had no facility for retracting the downwardly hanging curtains and, thus, the car wash was able to provide either hand washing operation or automatic washing operation, but not both.

The car wash apparatus, because of its use of hot water, detergents and waxes operates in a highly corrosive atmosphere for most metal parts. Thus, the usual sliding supports are not capable of providing maintenance-free operation. Also, curtains used in automatic car wash apparatus are usually provided with an oscillatory movement to further assist in the spreading of wax, suds and the like. Such oscillatory movement further inhibits the type of mechanism which may be used.

SUMMARY OF THE INVENTION

It is an object of the present invention to provide a retractable curtain for car washes which will permit the operator to offer both hand washing and automatic washing.

The present invention is for a retractable curtain assembly for use in car wash apparatus. The assembly has at least one curtain frame supported above the floor and the curtain frame forms an elongated rectangle having rail means along the two opposing sides thereof and having opposing ends. The curtain frame, or each curtain frame, has at least two lengths of links interconnected at the ends thereof, two of the lengths being connected to two corners of the frame at one end thereof. A plurality of curtain support rods are held by said rail means and interconnected through said lengths of links so that there are a plurality of links between each adjacent support rod. Retraction means are affixed to the outermost curtain support rod, and the retraction means can either push the outermost rod toward the end of the curtain frame to retract the curtain or pull it away from such end to extend the curtain. Preferably, the curtain is formed in two halves and there are two such retraction means so that the curtain parts in the middle and is retracted toward each of the opposing ends of the curtain support frame.

BRIEF DESCRIPTION OF THE DRAWINGS

FIG. 4 is a perspective view showing the top and front of two retractable curtains of the present invention.

FIG. 5 is an enlarged plan view of one-half of a curtain frame of the retractable curtain of FIG. 1.

FIG. 6 is an enlarged view taken along line 6—6 of FIG. 4.

FIG. 7 is an enlarged, cross-sectional side view taken along line 7—7 of FIG. 5.

FIG. 8 is a view analogous to FIG. 7 except that it shows the curtain in retracted position.

FIG. 9 is a perspective view of a tear-away flap useful with the apparatus of FIG. 1.

DESCRIPTION OF THE PREFERRED EMBODIMENTS

Figure 1:
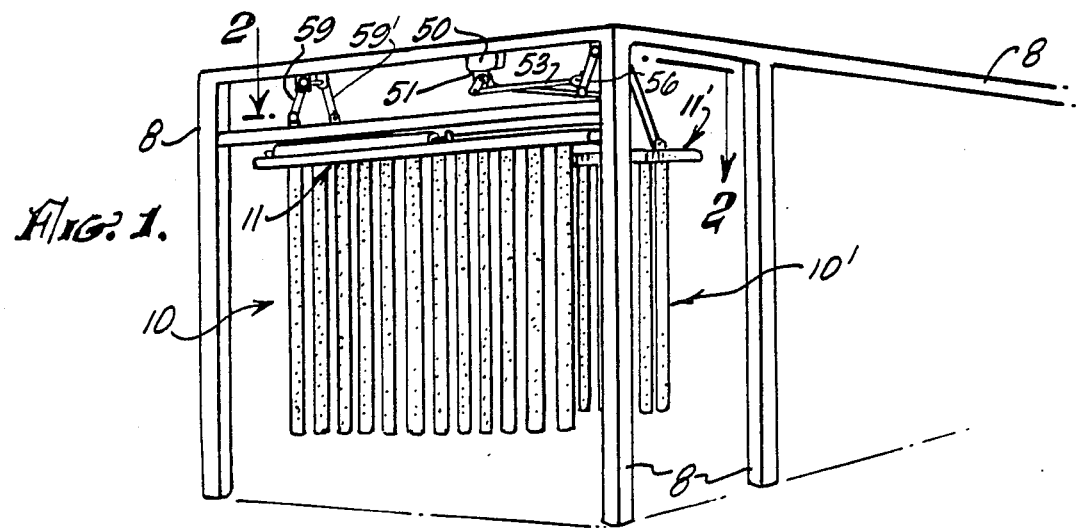
FIG. 1 is a perspective view of a portion of automatic car wash equipment including two retractable curtains of the present invention.
Figure 2:
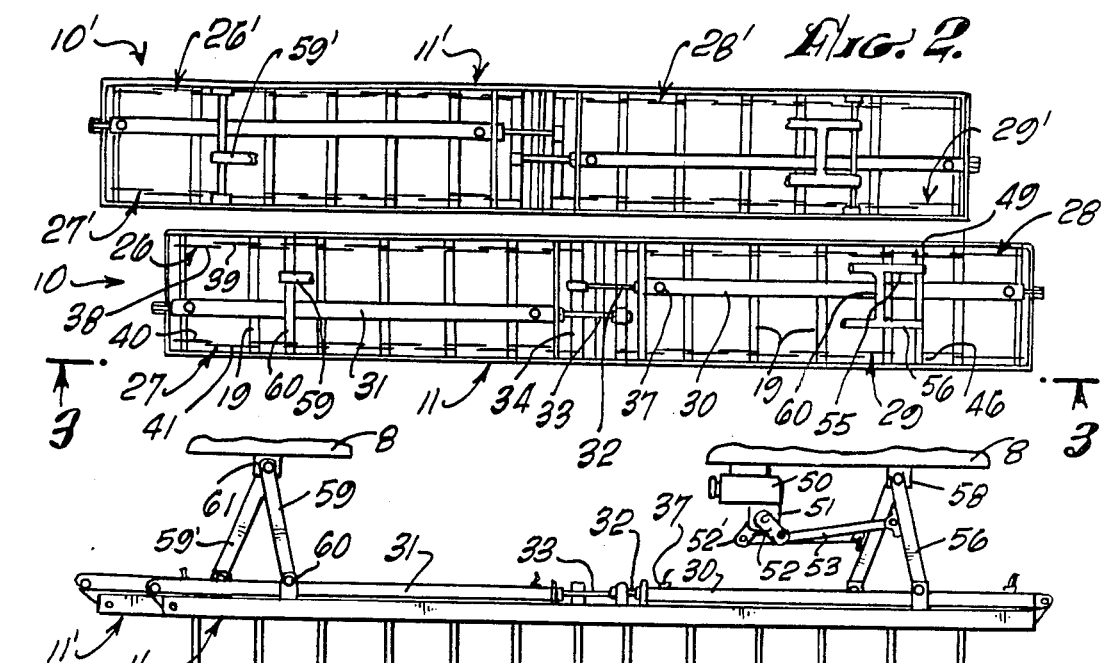
FIG. 2 is a plan view taken along line 2—2 of FIG. 1.
Figure 3:
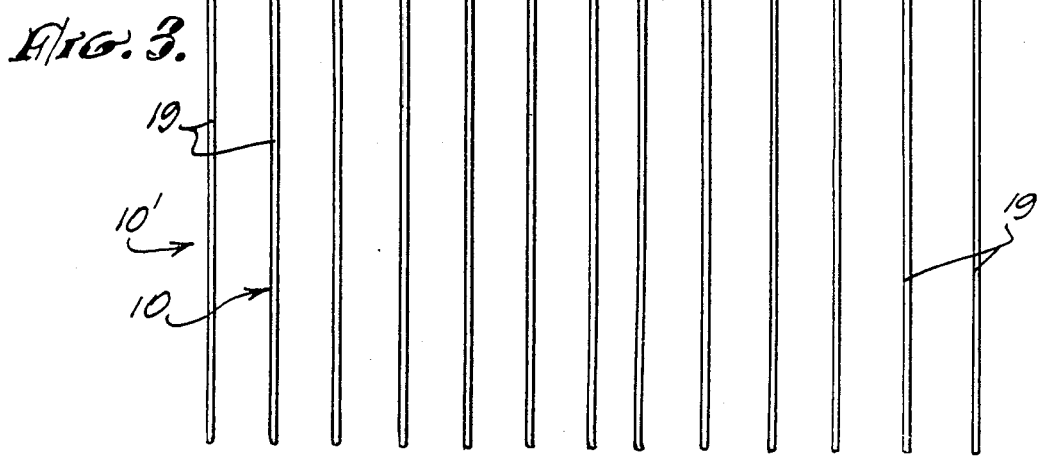
FIG. 3 is a side view taken along line 3—3 of FIG. 2.

A portion of an automatic car wash machine is shown in perspective view in FIG. 1 including a first retractable curtain 10 and a second retractable curtain 10', shown best in FIGS. 2 and 3. Curtains 10 and 10' are held in curtain frames which are supported by a main frame 8 held on floor 9. Each of the retractable curtains are supported by apparatus which permits them to be oscillated in a generally horizontal manner so that the flaps of the curtain will tend to spread wax, suds or other car wash material more evenly along the surface of the vehicle being washed. Curtains 10 and 10' are held by identical curtain frames indicated by reference characters 11 and 11'. The construction of the frame is shown best in FIG. 6 where it can be seen that a pair of rails is formed from angle irons 13 and 14. A second pair of angle irons 15 and 16 prevents the rotatable bearings 17 and 18 from lifting out of the channel formed between the two sets of rails. Angle irons 15 and 16 are removable by removing screws 17' and 18' which are positioned one to two feet apart along the rail formed by the two sets of angle irons. Curtains 10 and 10' are formed from a plurality of flaps, although other types of curtains could be used in conjunction with the present invention. A flap 19 is shown best in FIG. 6. Flap 19 is held by a flap support rod 20 over which a collar 21 has been placed. Two sets of washers 22 and 23 keep flap 19 near the center of frame 11'.

Bearings 17 and 18 are supported at the ends 24 and 25 of flap support rod 20 which is preferably fabricated from stainless steel because of the corrosive environment present. Bearings 17 and 18 are preferably fabricated from a polymer having a low coefficient of friction such as the polymer sold under the trademark, "Teflon."

As seen in FIG. 5, the rods, such as flap support rod 20, are interconnected by a plurality of links and, as shown in FIG. 2, frame 11' has four lengths of links indicated by reference characters 26', 27', 28' and 29'. These links permit the curtains to be retracted as shown best in FIG. 8. This is accomplished by a pair of air cylinders 30 and 31 which provide retraction means as well as extension means for the retractable curtains. Cylinder 30 has a rod 32 which is affixed to a clevis 34, the ends of which are held by flap support rod 35 which is the outermost flap support rod of its half of curtain 10. Thus, as air is introduced into the outer end of cylinder 30, rod 32 moves outwardly pushing clevis 34 and outermost, or last, flap support rod 35 toward end 36 of curtain frame 11. Conversely, when air is introduced at inlet 37 of cylinder 30, rod 32 retracts and pulls clevis 34 and its attached last flap support rod 35 back toward the center. Similarly, cylinder 31 and rod 33 work at the same time with the other half of curtain 10.

Preferably, the first and second links, such as 38 and 39 or 40 and 41, respectively, are of longer length than the third links 42 and 43. All of the remaining links on that half of the curtain are the same length as links 42 and 43. By making the first and second links longer, the folded curtain may move into the space occupied by the first and second links and, thus, the folded curtain is more compact than it would otherwise be if all the links were of the same length. Links 38 and 40 are pivotally connected to pin 44 and a notch 45 (shown in FIG. 7) is formed at each end of end 36 to permit links 38 and 40 to move in the position shown in FIG. 8 to maximize the outward movement of the two curtain halves.

FIG. 4 depicts a means to oscillate frames 11 and 11'. Frame 11 is suspended by arms attached to four pillow blocks 46, 47, 48 and 49. A motor 50 drives a set of gears in gear box 51 to provide an oscillating movement to oscillating arms 52 and 52'. Arm 52 is connected to a link arm 53 which, in turn, is held by pillow block 54 to an assembly consisting of arms 55 and 56 which are held by bearings 57 and 58. Bearings 58 and 61 are held by frame 8. Similarly, arm 59 is welded to a horizontal arm 60 which is held by bearings held in pillow blocks 47 and 48. Arm 59 is, likewise, held by a bearing 61 so that it may swing back and forth in a pendulum-like manner to create an oscillating movement in curtains 10 and 10'.

To eliminate possible damage to the apparatus by a flap becoming entangled on a car rack, or other apparatus, the flaps are preferably detachable. In FIG. 9, flap 63 has hook and eye material 64 affixed to its upper end. Conversely, a short length 65 of the flap similarly has hook and eye material 66 so that flap 63 may be affixed to the short length of flap 65 in a detachable manner. The hook and eye material, indicated by reference character 64 and 66, may be of the type commonly sold under the trademark, "Velcro." Typically, the operation of the apparatus of the present invention is assisted by a computer which causes the curtain to retract or extend and also interrupts the motor 50 to stop the oscillating motion which is, of course, of no use when the curtains are retracted.

While the unit of the present invention is depicted in the drawings as having two sets of oscillating frames, the present invention is useful with frames that do not oscillate and also with only one frame or more than two frames. While the links have been shown as bars which are essentially rectangular, other link means, such as chain, could also be used. Also, while the curtain is shown as retracting from the center, it is likewise possible that the curtain could be retracted all from one end to the other end. The division of curtain in the middle, however, is advantageous since it permits the use of air cylinders which may be compactly positioned as, for instance, shown in FIG. 3 of the drawings.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed:

1. A retractable curtain comprising a plurality of free hanging flaps for use in automatic car wash apparatus comprising:
   a first frame supported on a floor;
   at least one curtain frame held by said first frame, said curtain frame having a pair of opposing rail means spaced apart and said curtain frame being elongated and having two opposing ends;
   a plurality of flap support rods held by said pair of opposing rail means, each of said flap support rods supporting a downwardly hanging flap and each flap support rod having two ends;
   each curtain frame having at least two lengths of interconnected links, each of said lengths having a first link which is pivotally connected at one end to one of said opposing ends and a second link of each of said lengths being connected to the other end of the first link at its first end and at its other end being connected to the first of said flap support rods, and a third link being connected at its first end to said first of said flap support rods and at its second end to a forth link which, in turn, is connected to a link which is pivotally connected to the second of said flap support rods, and so on, each of said lengths having its last link connected to a last flap support rod;
   retraction means affixed to said last flap support rod, said retraction means moving said last flap support rod between its fully extended position and its fully retracted position whereby the flaps supported from said plurality of flap support rods may be retracted or extended as desired.

2. The retractable curtain of claim 1 wherein each curtain frame has four lengths of interconnected links and each length of links has its last link terminating near the midpoint of said curtain frame.

3. The retractable curtain of claim 1 wherein each flap support rod has a rotatable bearing at each end thereof.

4. The retractable curtain of claim 3 wherein said rotatable bearing is made from a polymer having a low coefficient of friction and said flap support rods are fabricated from stainless steel.

5. The retractable curtain of claim 1 wherein the first and second links of each of said lengths are longer than all the other links of said length which are all of the same length.

6. The retractable curtain of claim 1 wherein said retraction means comprises an air activated cylinder.

7. The retractable curtain of claim 1 wherein said curtain frame includes means for oscillating said frame with respect to said first frame.

8. The retractable curtain of claim 1 wherein there are two curtain frames.

9. The retractable curtain of claim 1 wherein each of said flaps has a short length connected to a flap support rod and a longer length affixed to said short length by tear away means.

10. The retractable curtain of claim 9 wherein said tear-away means comprises hook and eye attachment means.

11. The retractable curtain of claim 1 wherein every other link in said lengths is an inward link and each other link is an outward link.

12. The retractable curtain of claim 1 wherein said rail means comprises lengths of angle iron having a second angle iron affixed thereto so as to form a channel within which said flap support rods ride.

13. The retractable curtain of claim 12 wherein said second angle iron is removable to assist in the servicing of the retractable curtain.

14. A retractable curtain assembly for use in car wash apparatus, said retractable curtain assembly comprising:
   at least one curtain frame supported above the floor, said curtain frame forming an elongated rectangle having rail means along the two opposing sides thereof and said curtain frame having opposing ends;

each of said curtain frames having four lengths of links interconnected at the ends thereof, each of said lengths being connected by a first link to said frame near the four corners thereof, said lengths being retractable and extendable and, when extended, terminating near the midpoint of said curtain frame;

a plurality of curtain support rods including two outermost rods nearest the two opposing ends of said curtain frame and two innermost rods, said curtain support rods being supported by said rail means and interconnected through said lengths of links so that there are a plurality of links between each adjacent curtain support rod at each end of said rods;

first and second equally sized curtain means held in each curtain frame, said curtain means being supported by said plurality of curtain support rods;

a pair of retraction means affixed to the two innermost curtain support rods whereby said first and second curtain means may be extended and retracted.

15. The retractable curtain of claim 14 wherein each of said links is an elongated bar and there are two links between each curtain support rod at each end thereof.

16. The retractable curtain of claim 15 wherein said lengths of links have first and second links which are longer in length than any of the other links.

17. The retractable curtain of claim 14 wherein said retraction means comprises first and second air cylinders, the first air cylinder being supported by said curtain frame above said second curtain means and having a piston which pushes the first curtain means into a retracted position and pulls said first curtain means into an extended position and a second air cylinder also being supported by said curtain frame and being held over said first curtain means and having a piston which pushes the second curtain means into a retracted position and pulls said second curtain means into an extended position.

* * * * *